Dec. 30, 1930.  W. SAMUELS  1,787,173
PISTON DRIVE
Filed Oct. 21, 1927   2 Sheets-Sheet 2
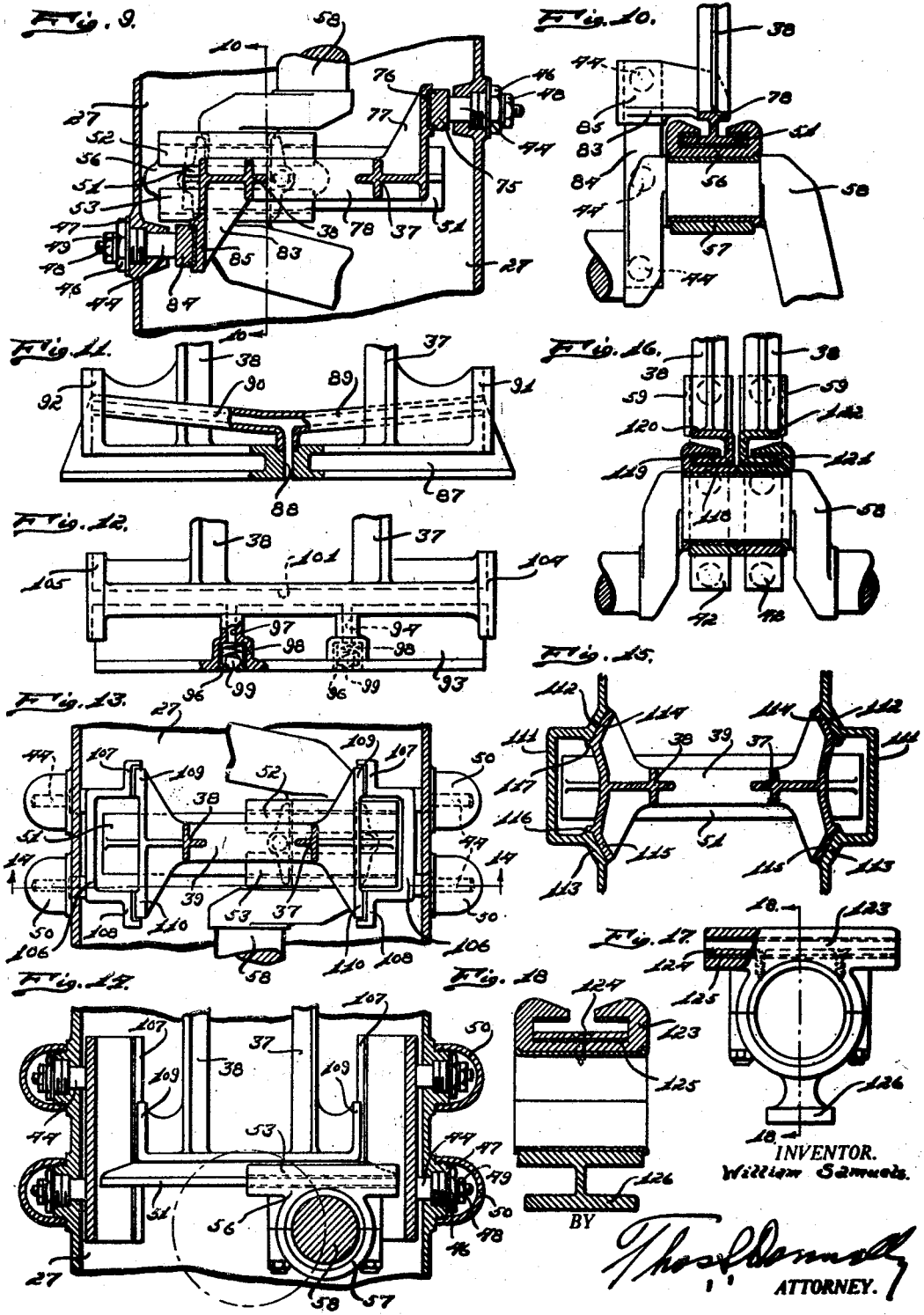

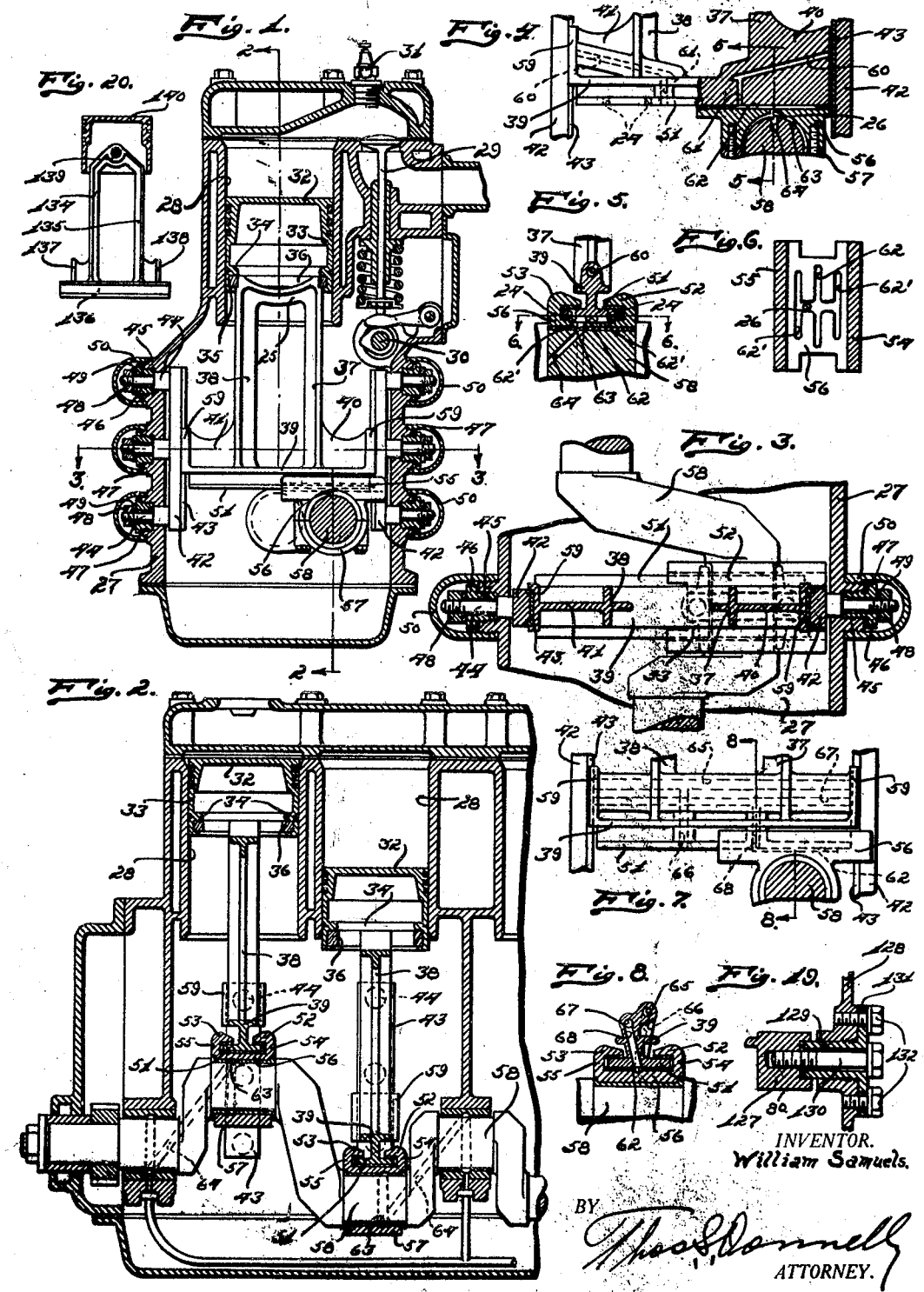

Patented Dec. 30, 1930

1,787,173

UNITED STATES PATENT OFFICE

WILLIAM SAMUELS, OF DETROIT, MICHIGAN

PISTON DRIVE

Application filed October 21, 1927. Serial No. 227,842.

My invention relates to a new and useful improvement in a piston drive, and particularly that class of piston drive which is commonly used in an internal combustion engine, although from the description it will be apparent that the drive may be used to advantage in all types of engines in which a crank shaft is driven by a reciprocating piston.

In piston drives, as commonly used now, where a crank shaft is connected to the piston by means of a connecting rod and a wrist pin, the angular movement of the connecting rod superimposes upon the primary harmonic dynamic forces, harmonic forces of a secondary and still higher order. In multi-cylinder engines it is possible to balance the primary forces and some of the higher orders under the approximate rules; as more cylinders are added, the better the balance. In four cylinder engines already the secondary forces, which are most important next to the primary forces, are normally unbalanced.

Various devices have been developed to counteract and counterbalance the unbalanced forces especially in four cylinder engines. It is an object of the present invention to eliminate the unbalanced forces, particularly by removing the causes of these unbalanced forces.

To this end, I provide a novel and simple means of making connection between the reciprocating piston and the crank of the crank shaft.

Other objects will appear hereinafter.

The invention consists in the combination and arrangement of parts hereinafter described and claimed.

The invention will be best understood by a reference to the accompanying drawings which form a part of this specification, and in which, Fig. 1 is a central, vertical, transverse sectional view of an engine embodying the invention.

Fig. 2 is a fragmentary, sectional view taken on line 2—2 of Fig. 1.

Fig. 3 is a fragmentary sectional view taken on line 3—3 of Fig. 1.

Fig. 4 is a fragmentary, sectional view similar to Fig. 1 showing lubrication details.

Fig. 5 is a fragmentary, sectional view taken on line 5—5 of Fig. 4.

Fig. 6 is a view taken on line 6—6 of Fig. 5.

Fig. 7 is a fragmentary view similar to Fig. 4, showing lubrication details of a modified form.

Fig. 8 is a sectional view taken on line 8—8 of Fig. 7.

Fig. 9 is a fragmentary, sectional view, similar to Fig. 3 of a modified form of the invention.

Fig. 10 is a fragmentary, sectional view taken on line 10—10 of Fig. 9.

Figs. 11 and 12 are two fragmentary views similar to Fig. 4, showing lubrication details of two modified forms.

Fig. 13 is a view similar to Fig. 9 of a further modified form of the invention.

Fig. 14 is a sectional view taken on line 14—14 of Fig. 13.

Fig. 15 is a sectional view similar to Fig. 13 of a further modified form of the invention.

Fig. 16 is a sectional view similar to Fig. 10 of a further modified form of the invention.

Fig. 17 is a front elevational view of a modified form of slide block.

Fig. 18 is a sectional view taken on line 18—18 of Fig. 17.

Fig. 19 is a fragmentary sectional view illustrating a modified form of guide member and attachment method.

Fig. 20 is a front elevational view of a modified form of piston connecting means.

In the simplest form as shown in Fig. 1, I have illustrated the invention used with an engine having a crank case 27, a cylinder 28, control valve 29, cam shaft 30 and spark plug 31, this engine being constructed in a well known manner.

A piston 32 is adapted for reciprocating movement in the cylinder 28 and is provided with a skirt 33 having a bead 34 formed intermediate its ends and having its open end angularly turned as at 35 to grip, between the angularly turned end 35 and the head 34, a ring 36 which is connected to downwardly extending struts 37 and 38, preferably formed from T section. These struts, which, adjacent their upper ends, are braced to each other by a cross member 25, connect at their bottom to a slide rail 39 which is formed preferably in the shape of an I-beam and connected by the webs 40 and 41 to the upwardly extending slide plates 59. Arranged on the inner surface of the crankcase, but fastened to the same so that no inside machining of the crankcase is required, are vertically extending guide bars 42 which engage the slides plates 59. Projecting outwardly from these guide bars 42, each of which is provided with a Babbitt lining 43 on its face, are studs 44 projecting through drilled holes ending in interiorly and exteriorly threaded nipples 45. The stud 44 fits closely with its larger diameter in the drilled hole, after which it is stepped down to a smaller diameter, leaving a shoulder between. A gland 46 threads into the nipple 45 for engaging with its head the shims 47 and with its end face the stud shoulder. The reduced portion of the stud 44 passes with free play through the bore of the gland 46. A nut 48 engaging the lock washer 49 is threaded on the stud 44, and a cap 50 is threaded on the exterior of the nipple 45. The lower portion 51 of the slide rail 39 is engaged by the angularly turned, inwardly directed ends 52 and 53 of the flanges 54 and 55, which project upwardly from the slide block 56 which, with the lower half bearing 57 is rotatably mounted on the crank 58 of the crank shaft. The slide saddle formed in the above manner around the slide rail 39 has its sliding surfaces also Babbitt lined. This slide saddle, as may be seen from Fig. 3 and more plainly from Fig. 6, has at both ends rectangular recesses, provided so as to clear the guide bars 42 in the extreme positions of the slide block.

In operation, when the explosion takes place in the cylinder and the piston is forced downwardly, the latter guided in the cylinder by its own skirt and in the crank case by the slide plates 59, with which it is connected by the struts 37 and 38 and by the slide rail 39, will have a true axial movement. When the piston moves upwardly and downwardly the slide block 56 will move transversely of the cylinder axis or longitudinally of the slide rail 39. I am aware that a slidable connection of the crank shaft with the piston has been previously known, but the details of structure which I have shown herein and which make the method practical for the purpose are to my knowledge new, as is the realization of the possibilities inherent in this method.

Fig. 2 shows how, in a well known manner, oil is supplied to a circular groove in the main bearings and hence through drilled holes 64 in the crank shaft to a circular groove 63 in each slide block bearing. With reference to Figures 4, 5, and 6, it will be seen that the inner sliding surface of the saddle has three parallel grooves in the sliding direction, the center groove 62 and the side grooves 62'. All three grooves terminate inside of the sliding surface, so as to seal the oil, and are connected by a central cross groove which in turn communicates by a drilled hole 26 with the circular groove 63. Hence, the parallel grooves are constantly filled with pressure oil. At suitable distances, the lower flange of the slide rail 39 is provided with drilled holes 24 in line with the grooves 62', so that during the slide motion at least one of the holes 24 is in communication with one of the grooves 62'. Thus the opposite sliding surface receives oil constantly. In line with the groove 62 are two holes 61 drilled in the slide rail 39 symmetrically to its center and communicating through passages 60 with the sliding surfaces of the slide plates 59. Thus, during one half revolution, oil is supplied from the groove 62 to one slide late 59 and during the next half revolution to the other slide plate 59.

Figs. 7 and 8 show a modified form of lubrication. The slide plates 59 are connected by two parallel passages 65 and 67 spaced diagonally from each other. Corresponding to the vertical holes 61 of Fig. 4 are the inclined holes 66 and 68 leading from the central plane of the slide rail 39 to passages 65 and 67 respectively. In this manner oil is fed from the groove 62 to both slide plates either through the hole 66 or the hole 68 in any position of the slide block.

Fig. 11 shows a simplification of the lubrication method. A central passage of the slide rail 87 leads through passages 89 and 90 to the slide plates 91 and 92 respectively. This method is applicable, where the slide saddle is long enough to cover the center of the slide rail 87 in its extreme positions.

Fig. 12 shows a modified form of lubrication. The slide plates 104 and 105 of the slide rail 93 are connected by a straight passage 101 into which lead the two passages 94 and 97 from the lower flange of the rail 93. The mouth of each of these passages 94 and 97, adjacent the lower surface of the slide rail 93 is equipped with a check valve consisting of the ball 99, the spring 98, and the valve cup 96, pressed into the slide rail 93. Thus passages 94 and 97 may be alternately fed with oil from the slide block without being bled by an uncovered opening.

These check valves, protecting the inlet of the oil passages adjacent the lower slide rail surface may be used to advantage also in conjunction with the lubrication methods described previously, to protect the system from oil loss through gravity and dynamic causes.

Figs. 9 and 10 show a slightly modified form of the invention, in which the slide plates 76 and 85 are offset in relation to the slide rail 78, with which they are connected by webs 77 and 83. The guide bars 75 and 84 take corresponding offset positions and are anchored to the crankcase basically as previously described. With this construction, the saddle of the slide block may be made longer and with ends unbroken by recesses without interfering with the guide rails 75 and 84. The offsetting of the guide bars and slide plates may be done, as shown, one bar to the front, the other to the rear, or both to the front, or both to the rear.

In Figs. 13 and 14 a modified form of the invention is shown which combines the advantages of the offset construction with those of the aligned mounting. The stationary guide bar on either side of the crankcase is divided into a double guide bar having one slide face 107 in the rear and a second slide face 108 in front of the slide rail. Correspondingly, the slide plate on either side of the slide rail projects to the rear and to the front of the slide rail, having wings 109 and 110 with which to engage the slide faces 107 and 108 respectively. Between the front and the rear guide bar a pocket is formed to receive the ends of the slide rail and the slide block saddle in its extreme positions. Thus a long slide saddle, unbroken by recesses, is possible in conjunction with narrow spaced guide bars and symmetrical supports. While in Figs. 14 and 13 the double guide bars are combined in one channel-like piece 106 and anchored in the crankcase as one piece, this is not essential. The front bar may be made one piece and the rear bar one piece, and each bar may be anchored individually.

The operation of this structure is quite similar to the operation already described, the dotted circle shown in Fig. 14 indicating the path of travel of the center of the crank.

A manufacturing modification of the double guide bar construction is shown in Fig. 15 which represents a section similar to Fig. 13. The guide bars 112 and 113 are made integral with the crankcase, which between them at 111 forms the requisite pocket. The guide bars 112 and 113 as well as the engaging slide plate wings 114 and 115 have slightly curved slide faces in such a manner that the guide bar faces of the crank case may be produced by boring the latter concentrically to the cylinder axis. Ledges 116 and 117 projecting from the wings 114 and 115 into the aforementioned crank case pocket, key the slide rail in its proper plane.

In Fig. 16 I have shown a modified form of the structure which is particularly adapted for use with a V type of engine. Two slide blocks 119 and 121 sit side by side on one crank pin. The block 119 engages the slide rail 120 and the block 121 engages the slide rail 122. In contrast to the previous structures, however, these slide rails are of channel section, the channels being open to the outside. The surfaces of the lower horizontal channel flange 118 are the sliding surfaces. Correspondingly, the slide saddles of the blocks 119 and 121 are also of channel section, the channels being open to the inside. Thus for each unit the saddle channel grips the flange 118 of the slide rail channel. The two units, including particularly the guide bars, have to be arranged to include the V angle of the engine between each other. This angle, for greater clarity, is not shown in Fig. 16.

Obviously the channel structure of the slide rail and the slide saddle, revealed here in connection with a V engine design, is not limited to this type of engine but may be used with any cylinder arrangement by placing only one slide block on a crank pin. On the other hand, a V type engine may be equipped with couples of slide blocks fitting to slide rails of I section.

In Figs. 17 and 18 I have shown a modified form of slide block in which the slide saddle 123 is provided with a wear plate 124 fastened thereto and beneath which shims 125 may be positioned so that an adjustment of the slide saddle as to its slide width may be effected. It will also be noticed that the lower half of the slide block carries a counterbalancing portion 126 so that the slide saddle 123 is counterbalanced by the portion 126.

In Fig. 19 I have shown a modified method of anchoring the guide bar to the crank case, the object being again to avoid inside machining of the crank case. A sleeve 129 having a flange 131 fits closely into a hole in the crank case 128 and butts with the flange 131 against an outside face of the crank case. The sleeve projects through the hole into the crank case and is held in place by a threaded portion near the flange and also by two screws 132 extending through the flange 131 into the crank case. The guide bar 127 has, opposite its slide face, a round recess that fits closely over the inner end of the sleeve. Between the bottom of the recess and the end of the sleeve, adjusting shims 80 may be placed. In the center of the recess a tapped hole penetrates into the guide bar 127. The bolt 130 extends with free play through the bore of the sleeve, resting with its head on the flange 131 and threads into the tapped hole in the guide bar. While in Fig. 19 the sleeve shown is fastened to the crank case by a threaded portion and by two screws 132, it may also be fastened only by such a threaded portion or only by such screws.

In Fig. 20 I have shown a modified form of the structure in which the struts 134 and 135 are connected to a slide rail 136 having the slide plates 137 and 138 projecting upwardly therefrom. At their upper ends the two struts meet in a gable-like manner, thus forming together with the slide rail a frame.

Adjacent the crest of the gable a pin 139 similar to a conventional wrist pin connects the frame with the piston 140.

It is believed obvious that various other types and forms of the invention may be made without departing from the spirit of the invention, or the scope of the appended claims, but the preferred forms have been illustrated herein as examples of such modifications.

Having thus described my invention what I claim as new and desire to secure by Letters Patent is:

1. In a mechanism of the class described, a piston; a piston extension carrying crosswise a slide rail; guide bars for the piston extension; a crank; and a crank block forming a bearing around said crank and forming a slide saddle around said slide rail, said slide saddle having end recesses adapted to clear said guide bars in the extreme positions of the slide block.

2. In a mechanism of the class described, a slide block, forming a bearing adapted to receive a crank pin and forming a slide saddle adapted to receive a slide rail, said slide block carrying opposite said slide saddle a counterweight with which to counterbalance in any degree said slide saddle.

3. In a mechanism of the class described, a slide block; a slide rail adapted to engage said slide block; slide plates extending upwardly from said slide rail adjacent its ends; a frame extending upwardly from said slide rail, positioned inwardly of said slide plate; and means for connecting the upper end of said frame to a piston.

4. In a mechanism of the class described, a slide block, a slide rail adapted to engage said slide block; slide plates extending upwardly from said slide rail adjacent its ends; a frame extending upwardly from said slide rail positioned inwardly of said slide plates; guide bars engaging said slide plates; and means for connecting the upper end of said frame to a piston.

In testimony whereof I have signed the foregoing specification.

WILLIAM SAMUELS.